N. POWER.
SHUTTER MECHANISM FOR MOVING PICTURE MACHINES.
APPLICATION FILED JUNE 6, 1916. RENEWED JAN. 21, 1922.
1,427,228.
Patented Aug. 29, 1922.
2 SHEETS—SHEET 2.
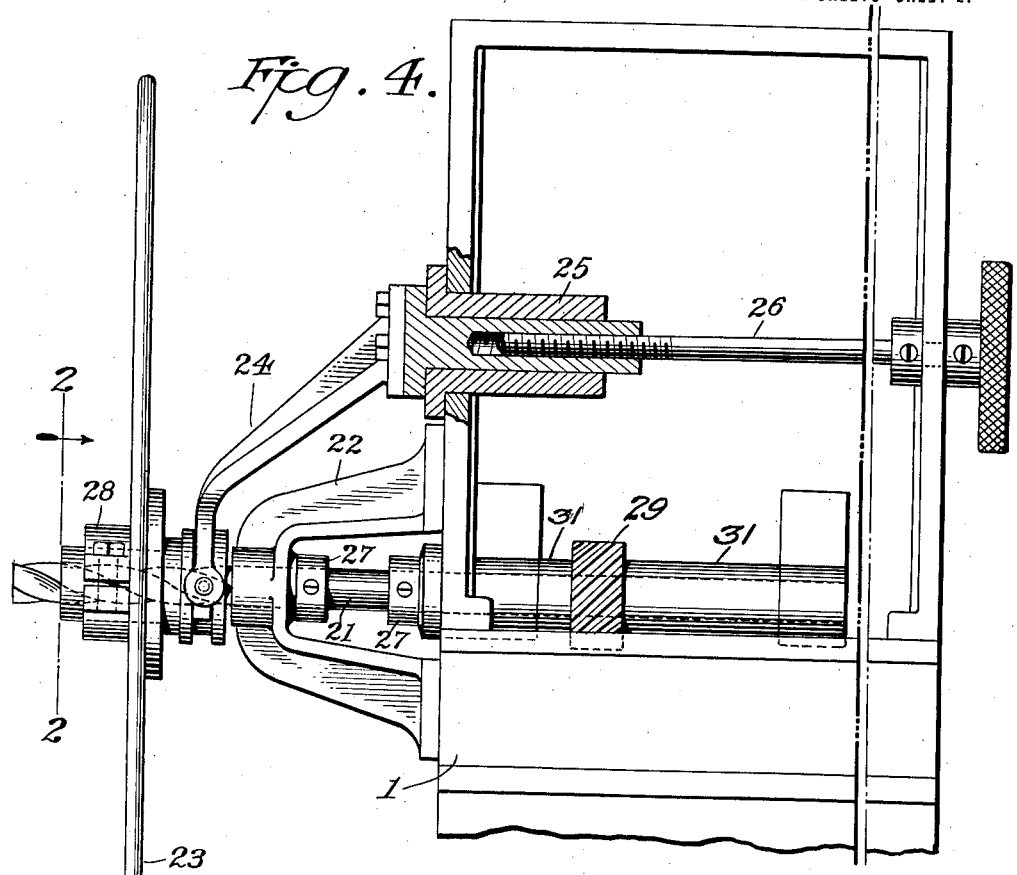
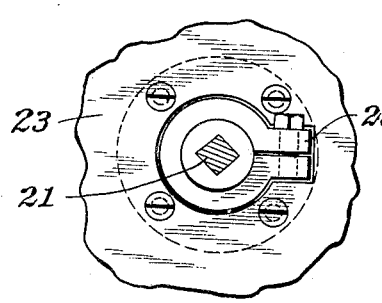
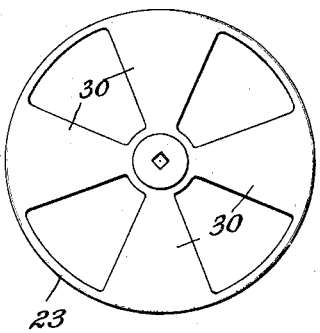
Inventor
Nicholas Power
By his Attorney
W.B. Morton

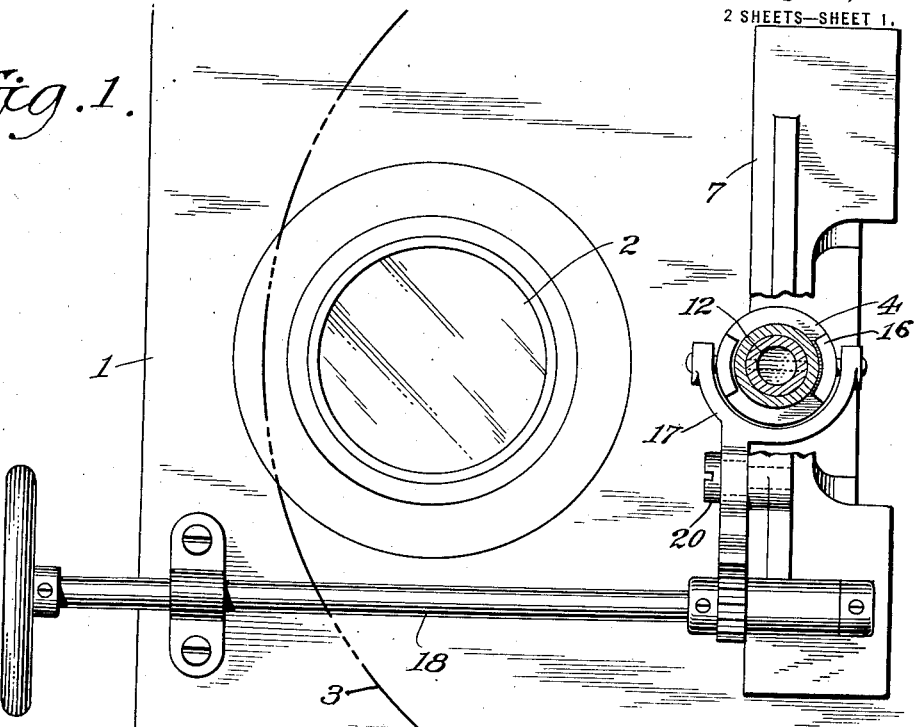
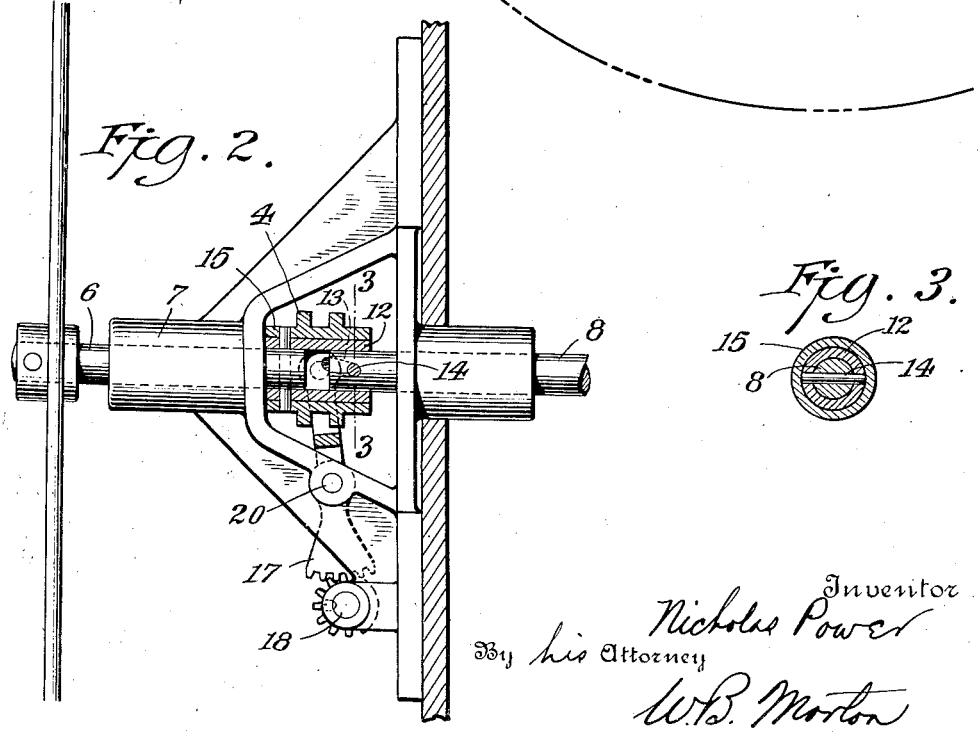

UNITED STATES PATENT OFFICE.

NICHOLAS POWER, OF BROOKLYN, NEW YORK, ASSIGNOR TO NICHOLAS POWER COMPANY, OF NEW YORK, N. Y., A CORPORATION OF DELAWARE.

SHUTTER MECHANISM FOR MOVING-PICTURE MACHINES.

1,427,228.      Specification of Letters Patent.   Patented Aug. 29, 1922.

Application filed June 6, 1916, Serial No. 102,071. Renewed January 21, 1922. Serial No. 531,003.

*To all whom it may concern:*

Be it known that I, NICHOLAS POWER, a citizen of the United States, and a resident of the borough of Brooklyn, county of Kings, city and State of New York, have invented new and useful Improvements in Shutter Mechanism for Moving-Picture Machines, of which the following is a specification.

This invention relates to shutters for moving picture machines and has for its object to provide a shutter having an adjustment whereby the time of operation of the shutter to cut off the light from the screen may be varied with relation to the film feed to maintain a proper synchronism of operation between the periodic obscuring of the light and the intermittent motion of the film.

In moving picture machines as now almost universally constructed the film is fed intermittently with a period of movement of one fourth or less duration than the intervening period of rest. Such machines have a continuously revolving shutter consisting usually of a sheet metal disk with sectors cut away for the passage of the light, with intervening solid uncut sectors for obscuring the screen during the period of movement. If the shutter and intermittent operation of the film feed gets slightly out of synchronism, as by reason, for instance, of worn gears, so that the screen is not obscured during the entire movement of the film, the movement of the film will be shown on the screen by light streaks across the picture, known to operators as "travel ghost." This can be prevented by having the uncut sector of the shutter of an angular width sufficiently great to give a "lap" as it were, on the movement of the film sufficient to allow a margin on each side of the actual period of movement of the film. To do this, however, obviously cuts off from the period which the film is illuminated and therefore reduces the brilliance of the picture. To increase the width of the shutter blade is also desirable for the reason that it has been shown that the "flicker," so pronounced in the moving pictures in the early development of the art, is largely eliminated by providing the shutter with additional blades which cross the path of light during the time the film is stationary in order to produce the interruptions of the light in such rapid succession as not to make distinct impressions upon the retina of the eye. It has also been found that if all the periods of illumination and of interruption of the light are of the same duration the flicker is eliminated to the greatest extent. In the machines known as the "Power's cameragraph" the shutter has three blades and the intermittent movement of the film is effected through a cam movement, such as shown in Patent No. 1,129,121 of Feb. 23, 1915, in which the driving and locking portions of the cam may be so proportioned as to give the film its complete movement in slightly less than one sixth the time of a complete rotation of the cam.

With the intermittent movement of this character a shutter may be used having three blades all of equal width of 60° each and three intervening openings also of 60° each so that the periods of illumination and the periods of darkness on the screen are all equal, by which arrangement a most perfect elimination of the flicker is obtained. It is obvious, however, that with this arrangement it is not possible to have the period of darkness in which the film is shifted of much greater duration than the actual time of movement of the film, so that a slight inaccuracy of adjustment between the shutter and the film movement will tend to produce the "travel ghost" described above.

My present invention has for its object the provision of a mechanism whereby the relation of the shutter operation to the movement of the film may be adjusted with accuracy and may be maintained so adjusted during the operation of the machine so that the "ghost" may be prevented without the provision of the "lap" above mentioned.

My invention also provides a shutter of novel construction and arrangement by which the shutter may be adjusted into proper relation with the film movement regardless of the position in which it may be originally placed on the shutter-shaft, thereby avoiding the necessity of predetermining the position of the shutter every time the machine is set up for operation.

In the accompanying drawings, wherein

I have disclosed a preferred form of my invention, and also a modification,

Fig. 1 is a front elevation of a portion of a moving picture machine showing my shutter adjusting mechanism as designed for existing shutters;

Fig. 2 is a side elevation of the mechanism shown in Fig. 1;

Fig. 3 is a sectional view on line 3—3 of Fig. 2;

Fig. 4 is a vertical sectional view of a portion of a moving picture machine showing an alternate form of shutter adjusting mechanism which is particularly adaptable for use with my improved shutter;

Fig. 5 is a sectional view on line 2—2 of Fig. 4; and

Fig. 6 is a detail view showing my improved shutter in elevation.

Referring to the drawings, 1 indicates the frame of the machine in the front wall of which is supported the lens 2 through which the light is projected on the screen. The light rays through the lens cross in front of the lens where the cross-section of the lighted area is very small, and at this point the shutter 3 is positioned to intercept the light rays. The shutter 3 for use with this adjustment may be of the usual construction consisting of a sheet metal disk having three opaque shutter wings with intervening openings.

The shutter is supported on the end of a shaft 6 rotatably mounted in a bracket 7 projecting from the front wall of the machine, the shaft 6 being driven from a shaft 8 in alignment with it, the two shafts being connected by the improved adjusting mechanism. The rear shaft 8 is driven continuously through suitable spiral driving gears, not shown, from some continuously moving shaft, of the machine.

The shafts 6 and 8 are connected by means of a sleeve 12 attached to the end of the shaft 6 and fitting over the end of the shaft 8. The sleeve 12 is provided with two oppositely inclined slots 13 which fit over the ends of a pin 14 set in the end of the shaft 8. Surrounding the sleeve 12, and fast to it is a second sleeve 15 having a pair of collars 4 formed intermediate its ends to provide a groove for receiving the shoes 16 of the shutter yoke 17 by means of which the sleeves are longitudinally adjusted with relation to the axis of the shafts.

The yoke 17 may be operated by any suitable mechanism and for the purpose I have shown a hand-shaft 18 extending beneath the lens and carrying a pinion meshing with a toothed sector forming a downward extension of the yoke beneath its pivot screw 20.

To prevent lost motion in the pin and slot connection between the shaft 8 and the sleeve 12, the ends of the pin are preferably provided with shoes cut to fit the slots, one of which shoes may be integral with the pin or the pin itself may be shaped throughout its length of a cross section to fit the slots although, of course, shorter than the slots in order to permit the adjustment.

It will be observed that the slots are of very quick pitch, that is, are inclined very slightly to the axial line of the shaft so that the connection will produce no end thrust in driving the shutter. It will of course be understood that the adjustment necessary is very slight, not more than a few degrees, which will be taken care of with a very slight movement of the sleeve and the attached shaft 6 toward or away from the shaft 8.

The geared adjusting connection not only provides a convenient means for shifting the yoke but also holds the parts against accidental displacement during the operation of the machine. In use the trained eye of the operator will detect the "travel ghost" before it is perceptible to the spectators, and he will immediately shift his hand-shaft 18 to slightly advance or retard the shutter, as may be necessary to again obtain perfect synchronism between the shutter and the movement of the film.

The longitudinal movement of the shaft and sleeve is so slight that the displacement of the shutter toward and from the lens is immaterial, although it will of course be obvious that the shaft 6 may be held against longitudinal movement and the sleeve fixed to the shaft by a key instead of a pin so as to move relatively to it.

In Figs. 4 and 5 I have illustrated a modification of an approved shutter adjustment wherein the shutter shaft is a single unitary piece and the adjusting screw extends along the side wall of the machine instead of across the front wall, this arrangement being preferable for some types of moving picture machines. As here shown the shutter shaft is indicated at 21 and is supported in the usual manner on the side wall of the machine in a position to be driven by one of the gears of the driving gear train. The shutter projects in front of the machine through an auxiliary supporting bracket 22, and on the end of the shaft the shutter 23 is mounted for rotation and also for movement longitudinally of the shutter shaft. The shutter shaft projects through the hub of the shutter, and the shaft and the hub are keyed together by spiral keyways forming in effect a thread of very quick pitch whereby a longitudinal displacement of the shutter on the shutter shaft will rotate the shutter with relation to the shaft.

The shutter is adjusted along the shaft by means of a yoke 24 engaging the externally grooved hub of the shutter and supported in an eye 25 or bearing, projecting from the side of the machine frame above the shutter shaft. The hub of the yoke which is supported in the bearing 25 has an internal thread for receiving the end of the adjusting screw 26 which is supported in a bearing near the wall of the frame, the projecting end of the screw being provided with a milled head for conveniently effecting its rotation. By turning the adjusting screw the shutter will be moved along the shutter shaft according to the direction of rotation of the screw and in such movement will be rotated as described.

The adjusting mechanism just described is particularly adapted for use with my improved shutter shown in Fig. 6 of the drawing for the reason that it permits a greater range of adjustment than the first described form. My improved shutter comprises four blades 30 each of 45 degrees angular extent with four intervening openings also of 45 degrees each. The shutter shaft is geared to the driving mechanism of the machine so as to be rotated at a speed to turn the shutter through three quarters of a complete revolution for each operation of the intermittent movement of the film feed. By this arrangement each blade of the shutter successively acts as the effective blade to conceal the film movement, the light being intercepted twice while the film is stationary, in the usual manner. The effect of the shutter on the light is the same as the three-blade shutter with blades and openings of equal width, the advantage of the new shutter being that by an adjustment of only 90 degrees it may be advanced or retarded the full distance between two blades. In other words, an adjustment of 90 degrees will cover every possible position of the shutter with relation to the shaft.

In transporting moving picture machines the shutter is removed to reduce the bulk of the machine and each time the machine is set up the shutter has to be reassembled on its shaft in proper position for covering the aperture during the movement of the film. With machines as previously constructed this operation required an experimental adjustment of the shutter to get the shutter in the right position. With my improved shutter and the adjusting mechanism of Figs. 4 and 5, the shutter may be placed on the shaft in any position and the adjustment effected after the machine is ready for operation by simply turning the adjusting screw. When the machine is taken down and the shutter removed the shutter shaft may be adjusted so as not to project beyond the bracket 22 by loosening the set collars 27 and pushing the shaft back in the long bearing of the driving gear 29 provided for the purpose, the driving gear being keyed to the shaft and held between spaced bearings 31 to permit this adjustment. To facilitate its removal the shutter is clamped on its hub by the split collar 28.

In either form of apparatus there is practically no end thrust in the spiral driving connection for the reason that the pitch of the spiral is so great that the driving pressure is substantially circumferential. Further, the weight of the shutter is so small that the wear on the spiral connections, even after a long period of use, is negligible.

I claim:

1. In a moving picture machine the combination of a casing, a shutter shaft supported therein and projecting beyond the front wall of said casing, a spiral cam on said shutter shaft, a shutter mounted thereon for rotation with the shaft and longitudinal movement thereon and means for effecting longitudinal movement of the shutter comprising a nut supported in said casing for axial movement in parallelism with said shutter, a connection between said nut and said shutter and a screw threaded in said nut projecting through said casing and beyond the rear wall thereof whereby the shutter may be adjusted by the rotation of the screw.

2. In a moving picture machine, the combination of a casing, a shutter shaft supported therein and projecting beyond the front wall thereof, a shutter mounted for longitudinal adjustment on said shaft, and means for adjusting said shutter comprising a nut supported in said casing for axial movement in parallelism with said shutter shaft, said nut projecting beyond the front wall of the casing, a rigid extension on said nut having engagement with the shutter to effect the longitudinal movement of the shutter with the nut, and an adjusting screw threaded in said nut and projecting beyond the rear wall of the casing whereby the shutter may be adjusted by rotation of the screw.

3. In a moving picture machine, a frame, a shutter shaft supported in said frame for rotation in said frame, a shutter on said shaft, a spiral cam connection between said shutter and shaft, means for adjusting the shutter axially of the shaft comprising a nut supported in said frame for axial movement in parallelism with the shutter shaft, a yoke fixedly attached to said nut and engaging said shutter, and an adjusting-screw threaded in said nut, said adjusting screw being supported in fixed bearings, whereby said nut will be shifted axially by the rotation of the screw.

4. In a moving picture machine, a shutter shaft, a pair of spaced bearings therefor, a driving gear for said shaft mounted thereon for relative axial movement, said gear being held against axial movement with the shaft by certain of said bearings, a shutter mounted on the free end of said shaft, means independent of the shaft for adjusting the shutter longitudinally thereon, and for maintaining said shaft against movement in its bearings comprising a stop collar adjustably attached to the shaft between said spaced bearings.

Signed at New York in the county of New York and State of New York this 19th day of May, 1916.

NICHOLAS POWER.